Aug. 27, 1929.  H. BAUER  1,725,745
PICK-UP REEL
Filed May 5, 1927  2 Sheets-Sheet 1
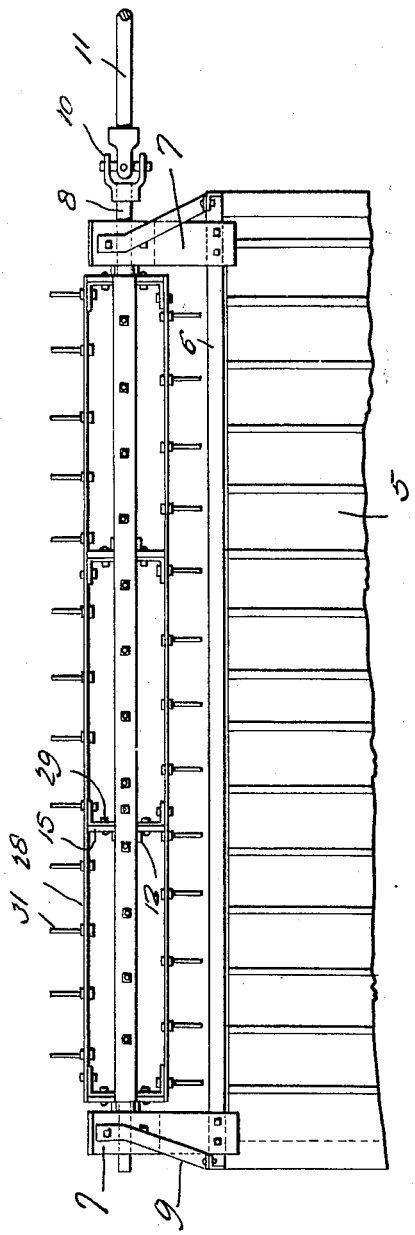
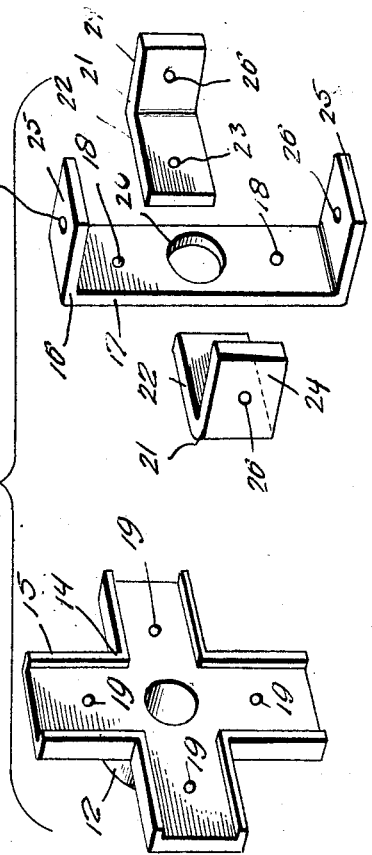
Inventor
Henry Bauer
By Clarence A. O'Brien
Attorney

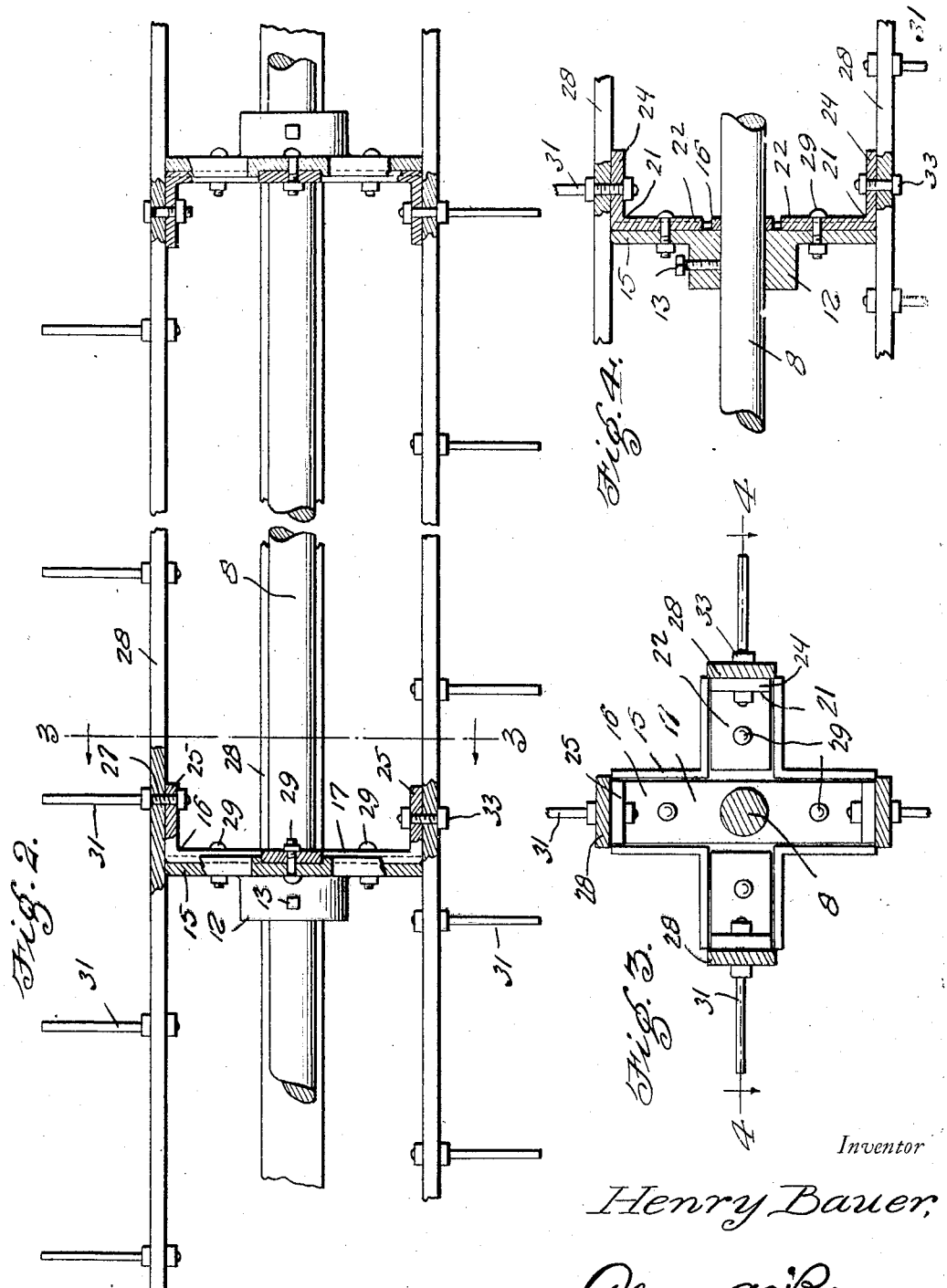

Patented Aug. 27, 1929.

1,725,745

UNITED STATES PATENT OFFICE.

HENRY BAUER, OF RITZVILLE, WASHINGTON.

PICK-UP REEL.

Application filed May 5, 1927. Serial No. 189,011.

The present invention relates to a farm apparatus in the form of a revolving reel for the purpose of picking up hay, straw, chaff, and other feed lying in dumps, windrows, or shocks, in the field and upon the ground. The invention is a useful farm machine in those parts of the country where hay, straw, chaff and feed are left in dumps to dry and are then transported by slip, truck, or wagon to be stacked.

The objects of the invention are:

To provide an apparatus of this nature that will do away with the necessity of having a man fork the feed from the ground to the wagon; to use horse and motor power to take the place of man power to accomplish the objects above set out; to provide a machine which is comparatively small, durable and strong enough to handle the purposes for which it is made and upon which there is little or no wear and tear and a very small upkeep.

A still very important object of the invention lies in the provision of an apparatus of this nature which is simple in its construction, thoroughly efficient and reliable in its operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of my apparatus showing the same attached to the frame of a binder canvas, Figure 2 is a fragmentary sectional elevation of the reel, Figure 3 is a transverse section therethrough taken substantially on the line 3—3 of Figure 2, Figure 4 is a sectional view taken substantially on the line 4—4 of Figure 3, Figure 5 is a disassembled perspective view of the spokelike structure of the reel.

Referring to the drawings in detail it will be seen that the numeral 5 denotes a binder canvas in a frame structure 6 usually of angle iron or the like. Bearing blocks 7 are fixed to the frame structure 6 and project outwardly thereof and have journaled therethrough a shaft 8. These bearing blocks are preferably braced by strap irons or like bracing means 9. The universal joint 10 is disposed between one end of the shaft 8 and a drive shaft 11 leading from any suitable source of power so that the shaft will operate in a direction opposite to the travel of the binder or the like. Spokelike structures are distributed along the shaft each comprising a hub 12 held in place on the shaft against rotation and longitudinal movement by set screws 13 or the like. Formed integrally with each hub 12 is a cruciform spider 14 having channel arms 15 at every 90 degrees about the hub. A U-shaped bracket 16 is receivable in two of the opposite arms 15 and has its bight portion 17 of elongated formation and provided with bolt openings 18 adapted to register with bolt openings 19 in said arms 15 and with a central opening 20 adapted to be circumjacent the shaft 8. A pair of L-shaped members 21 have arms 22 formed with openings 23 to register with openings 19 in the other arms 15 so that the arms 24 of said L-shaped members 21 will extend in the said general direction with the end portions 25 of the U-shaped member 16. These portions 24 and 25 are provided with apertures 26 to register with apertures 27 in bars 28. Bolts 29 hold the members 16 and 21 in place on the cruciform spiders 14 by piercing the respective openings 18, 23 and 19. The bars 28, preferably constructed of strap iron or the like have a plurality of pickers, teeth, or pins 31 piercing the openings 27 therein. Some of these teeth 31 are so arranged as to pierce openings 26 and the other openings are pierced by bolts 33. The teeth 31 on the various bars 28 are staggered in relation to each other as will be apparent from an inspection of Figure 1.

From the above detailed description it will be seen that I have devised a very simple and efficient structure for the purpose outlined above in which the parts may be readily assembled and disassembled, may be manufactured at a low cost and yet will be strong and durable and when assembled will present a compact arrangement. The present embodiment of the invention, of course, has been disclosed in detail merely by way of example since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed or sacrificing any of its advantages.

Having thus described the invention, what I claim as new is:—

In a reel structure of the type comprising a shaft, a group of longitudinal toothed bars about the shaft, and spoke-like structures on the shaft and joining the longitudinal bars thereto, the combination of a shaft, a spoke-like structure fixed on the shaft and comprising a hub circumjacent the shaft, means for fixing the hub to the shaft, a spider integral with the hub and having two pairs of channeled arms, and one pair of arms at right angles to the other pair of arms, a U-shaped member having its bight seated in and connected to two alined arms of the spider and receiving the shaft, and L-shaped members fixed in the other two arms of the spider and disposed at opposite sides of the shaft, the end surfaces of the members being flush with the ends of the arms of the spider, and longitudinal toothed bars grouped about the shaft and fixed to the arms of the members that are disposed longitudinally of the reel member, whereby the longitudinally disposed arms of the members reinforce and lend increased strength to the bars.

In testimony whereof I affix my signature.

HENRY BAUER.